(12) United States Patent
Ausseresse

(10) Patent No.: US 12,051,972 B2
(45) Date of Patent: Jul. 30, 2024

(54) HYBRID RESONANT POWER SUPPLY

(71) Applicant: Infineon Technologies Austria AG, Villach (AT)

(72) Inventor: Pierrick Ausseresse, Munich (DE)

(73) Assignee: Infineon Technologies Austria AG, Villach (AT)

( * ) Notice: Subject to any disclaimer, the term of this patent is extended or adjusted under 35 U.S.C. 154(b) by 1085 days.

(21) Appl. No.: 16/420,497

(22) Filed: May 23, 2019

(65) Prior Publication Data

US 2020/0373844 A1    Nov. 26, 2020

(51) Int. Cl.
| | |
|---|---|
| H02M 3/07 | (2006.01) |
| H02M 1/00 | (2007.01) |
| H02M 3/00 | (2006.01) |
| H02M 3/335 | (2006.01) |

(52) U.S. Cl.
CPC ............. H02M 3/07 (2013.01); H02M 3/01 (2021.05); H02M 3/33571 (2021.05); H02M 1/0003 (2021.05); H02M 1/0095 (2021.05)

(58) Field of Classification Search
CPC ............ H02M 1/00; H02M 1/38; H02M 1/32; H02M 3/33507; H02M 3/33592; H02M 3/33584; H02M 3/3376; H02M 3/3388; H02M 3/33523; H02M 3/3387; H02M 2001/0058; H02M 2001/0003; H02M 7/5387; H02M 7/493; H02M 1/083; H02M 3/33569; H02M 3/33576; H02M 2007/4815; H02M 2007/4818
USPC ..................... 363/17, 21.02, 21.03
See application file for complete search history.

(56) References Cited

U.S. PATENT DOCUMENTS

| | | | | |
|---|---|---|---|---|
| 4,855,888 A * | 8/1989 | Henze | ..................... | H02M 1/44 363/41 |
| 5,777,864 A * | 7/1998 | Seong | ............... | H02M 7/53803 323/217 |
| 5,959,410 A * | 9/1999 | Yamauchi | .............. | H05B 41/28 315/307 |
| 6,011,360 A * | 1/2000 | Gradzki | ............. | H05B 41/2856 315/209 R |
| 6,178,099 B1 * | 1/2001 | Schutten | ............. | H02M 3/3376 363/17 |
| 6,392,902 B1 * | 5/2002 | Jang | ................... | H02M 3/33569 363/17 |
| 6,807,070 B2 * | 10/2004 | Ribarich | ............. | H02M 3/3382 363/17 |
| 7,489,118 B2 * | 2/2009 | Fujii | ..................... | H02M 3/156 323/224 |

(Continued)

FOREIGN PATENT DOCUMENTS

WO    WO-2016149063 A1 *    9/2016    ............. H02M 3/07

*Primary Examiner* — Thienvu V Tran
*Assistant Examiner* — Nusrat Quddus
(74) *Attorney, Agent, or Firm* — Armis IP Law, LLC

(57) ABSTRACT

A power supply system includes a first stage, a phase delay circuit, and a second stage. The first stage includes a resonant power supply circuit operable to derive an intermediate voltage from an input voltage. The phase delay circuit is coupled between the first stage and the second stage of the power supply. During operation, the phase delay circuit applies a phase delay to the intermediate voltage generated by the resonant circuit. The second stage receives and converts the phase delayed intermediate signal into an output voltage that powers a load.

34 Claims, 11 Drawing Sheets

(56) References Cited

U.S. PATENT DOCUMENTS

| | | | | |
|---|---|---|---|---|
| 8,737,092 B2* | 5/2014 | Adragna | H02M 3/3372 | 363/21.02 |
| 8,842,450 B2* | 9/2014 | Jungreis | H02M 3/33569 | 363/21.03 |
| 9,042,125 B1* | 5/2015 | Wambsganss | H02M 3/3376 | 363/21.02 |
| 9,287,788 B2* | 3/2016 | Harrison | H02M 3/3387 | |
| 9,287,795 B2* | 3/2016 | Ma | H02M 3/3388 | |
| 9,322,890 B2* | 4/2016 | Xu | H02M 3/3376 | |
| 9,379,628 B2* | 6/2016 | Zambetti | H02M 3/33546 | |
| 9,425,700 B2* | 8/2016 | Lu | H02M 3/3376 | |
| 9,548,668 B2* | 1/2017 | Fu | H02M 3/33592 | |
| 9,608,512 B2* | 3/2017 | Zhak | H02M 3/158 | |
| 9,621,051 B2* | 4/2017 | Wagner | H02M 3/3376 | |
| 9,660,520 B2* | 5/2017 | Perreault | H02M 3/158 | |
| 9,755,672 B2* | 9/2017 | Perreault | H03F 3/19 | |
| 9,825,545 B2* | 11/2017 | Chen | H02M 3/33576 | |
| 9,831,776 B1* | 11/2017 | Jiang | H02M 1/15 | |
| 9,853,561 B2* | 12/2017 | Newman, Jr. | H05B 45/37 | |
| 9,985,516 B2* | 5/2018 | Schwartz | H02M 1/083 | |
| 9,997,996 B1* | 6/2018 | Halberstadt | H02M 1/4241 | |
| 10,181,804 B1* | 1/2019 | Li | H02M 7/4807 | |
| 10,186,971 B1* | 1/2019 | Xue | H02M 3/33507 | |
| 10,199,928 B1* | 2/2019 | Wiedenbauer | H02H 9/001 | |
| 10,218,255 B1* | 2/2019 | Petersen | H02M 3/158 | |
| 10,224,803 B1* | 3/2019 | Rainer | H02M 3/335 | |
| 10,256,729 B1* | 4/2019 | Notsch | H02M 3/1588 | |
| 10,340,794 B1* | 7/2019 | Zhang | H02M 1/32 | |
| 10,389,235 B2* | 8/2019 | Giuliano | H02M 3/1582 | |
| 10,389,275 B2* | 8/2019 | Notsch | H02M 3/33592 | |
| 10,476,395 B2* | 11/2019 | Dai | H02M 3/33592 | |
| 10,547,241 B1* | 1/2020 | Li | H02M 3/1588 | |
| 10,601,324 B1* | 3/2020 | Kudva | H02M 3/1588 | |
| 10,651,731 B1* | 5/2020 | Rainer | H02M 3/1588 | |
| 10,666,134 B2* | 5/2020 | Low | H02M 3/07 | |
| 10,680,513 B2* | 6/2020 | Giuliano | H02M 3/075 | |
| 10,756,624 B2* | 8/2020 | Mauri | H02M 3/158 | |
| 10,840,805 B2* | 11/2020 | Perreault | H03F 3/2178 | |
| 10,938,248 B1* | 3/2021 | Imazawa | H02M 3/01 | |
| 10,938,310 B1* | 3/2021 | Cheng | H02M 3/33515 | |
| 11,118,329 B2* | 9/2021 | Jura | E02F 9/2841 | |
| 11,121,573 B1* | 9/2021 | Oh | H02J 50/12 | |
| 2003/0147263 A1* | 8/2003 | Ribarich | H02M 3/3382 | 363/17 |
| 2004/0012985 A1* | 1/2004 | Ribarich | H02M 7/523 | 363/21.02 |
| 2005/0237037 A1* | 10/2005 | Xing | H02M 3/156 | 323/268 |
| 2005/0276084 A1* | 12/2005 | Wai | H02M 1/34 | 363/98 |
| 2007/0046353 A1* | 3/2007 | Yao | H02M 7/53871 | 327/236 |
| 2008/0048734 A1* | 2/2008 | Sidiropoulos | H03L 7/18 | 327/105 |
| 2008/0232138 A1* | 9/2008 | Yang | H03K 17/284 | 363/17 |
| 2011/0068965 A1* | 3/2011 | Sasaki | H02M 3/157 | 341/155 |
| 2011/0080146 A1* | 4/2011 | Li | H02M 3/285 | 323/237 |
| 2011/0103097 A1* | 5/2011 | Wang | H02M 3/33592 | 363/21.02 |
| 2011/0254379 A1* | 10/2011 | Madawala | H02J 5/005 | 307/104 |
| 2012/0013313 A1* | 1/2012 | Moussaoui | H02M 3/005 | 323/235 |
| 2012/0014138 A1* | 1/2012 | Ngo | H02M 3/33584 | 363/17 |
| 2012/0025720 A1* | 2/2012 | Chen | H02M 3/33571 | 363/16 |
| 2012/0099344 A1* | 4/2012 | Adragna | H02M 3/3372 | 363/21.03 |
| 2012/0242302 A1* | 9/2012 | Yonezawa | H02M 3/158 | 323/234 |
| 2012/0262953 A1* | 10/2012 | Jungreis | H02M 3/33569 | 363/17 |
| 2013/0308347 A1* | 11/2013 | Sato | H02M 1/32 | 363/21.03 |
| 2013/0314951 A1* | 11/2013 | Harrison | H02M 3/33592 | 363/21.02 |
| 2014/0092634 A1* | 4/2014 | Yan | H02M 3/33507 | 363/17 |
| 2014/0152109 A1* | 6/2014 | Kanakasabai | H02J 9/062 | 307/64 |
| 2014/0346962 A1* | 11/2014 | Sanders | H05B 45/3725 | 315/193 |
| 2014/0375361 A1* | 12/2014 | Ausseresse | H03K 3/01 | 327/109 |
| 2015/0029758 A1* | 1/2015 | Jacobson | H02M 3/33576 | 363/17 |
| 2015/0091452 A1* | 4/2015 | Hofmann | H02M 1/00 | 315/161 |
| 2015/0205314 A1* | 7/2015 | Hayashi | H02M 3/156 | 323/217 |
| 2015/0229225 A1* | 8/2015 | Jang | H02M 3/33569 | 363/17 |
| 2015/0244270 A1* | 8/2015 | Karlsson | H02M 1/32 | 363/17 |
| 2015/0318797 A1* | 11/2015 | Tamaoka | H02M 7/5387 | 363/132 |
| 2015/0349649 A1* | 12/2015 | Zane | H02M 1/4241 | 363/21.03 |
| 2015/0381074 A1* | 12/2015 | Flett | H02M 3/01 | 320/101 |
| 2016/0020693 A1* | 1/2016 | Ribarich | H02M 3/07 | 363/60 |
| 2016/0181926 A1* | 6/2016 | Ausseresse | H02M 3/33576 | 363/21.12 |
| 2016/0190933 A1* | 6/2016 | Lee | H02M 3/33507 | 363/17 |
| 2017/0093296 A1* | 3/2017 | Chen | H02M 1/088 | |
| 2017/0099001 A1* | 4/2017 | Cardu | H02M 1/083 | |
| 2017/0201177 A1* | 7/2017 | Kesarwani | H02M 1/14 | |
| 2017/0338695 A1* | 11/2017 | Port | H04B 5/0037 | |
| 2018/0041060 A1* | 2/2018 | Walley | H02J 7/00 | |
| 2018/0166992 A1* | 6/2018 | Houston | H02M 3/1582 | |
| 2018/0175732 A1* | 6/2018 | Dai | H02M 3/33507 | |
| 2018/0309372 A1* | 10/2018 | Leong | H02M 3/33576 | |
| 2018/0367051 A1* | 12/2018 | Agamy | H02M 3/33584 | |
| 2018/0375436 A1* | 12/2018 | Wagner | H05G 1/34 | |
| 2019/0020269 A1* | 1/2019 | Ekhtiari | H02M 3/33584 | |
| 2019/0036450 A1* | 1/2019 | Szczeszynski | H02M 3/073 | |
| 2019/0052180 A1* | 2/2019 | Meneses Herrera | H02M 3/33561 | |
| 2019/0200441 A1* | 6/2019 | Zhu | H05G 1/12 | |
| 2019/0252896 A1* | 8/2019 | Huang | H02M 3/00 | |
| 2019/0267907 A1* | 8/2019 | Jitaru | H02M 3/33576 | |
| 2019/0393776 A1* | 12/2019 | Low | H02M 3/07 | |
| 2020/0099290 A1* | 3/2020 | Szczeszynski | H02M 3/156 | |
| 2020/0106355 A1* | 4/2020 | Szczeszynski | H02M 3/1584 | |
| 2020/0220468 A1* | 7/2020 | Rainer | H02M 3/33507 | |
| 2020/0350820 A1* | 11/2020 | Grbovic | H02M 7/483 | |
| 2020/0358352 A1* | 11/2020 | Rizzolatti | H02M 3/33573 | |
| 2021/0028712 A1* | 1/2021 | Yu | H02M 1/4208 | |
| 2021/0111570 A1* | 4/2021 | Cho | H02J 50/80 | |
| 2021/0194364 A1* | 6/2021 | Jung | H02M 3/07 | |
| 2021/0367511 A1* | 11/2021 | Liu | H02M 3/07 | |
| 2022/0014086 A1* | 1/2022 | Ye | H02M 1/0058 | |
| 2022/0014109 A1* | 1/2022 | Ye | H02M 1/0003 | |
| 2022/0014110 A1* | 1/2022 | Ye | H02M 3/07 | |
| 2022/0045618 A1* | 2/2022 | Kumar | H02M 3/33592 | |
| 2022/0103066 A1* | 3/2022 | Chen | H02M 3/07 | |
| 2023/0080361 A1* | 3/2023 | Koyama | H02M 3/33571 | 363/21.02 |
| 2023/0353058 A1* | 11/2023 | Rizzolatti | H02M 3/155 | |

* cited by examiner

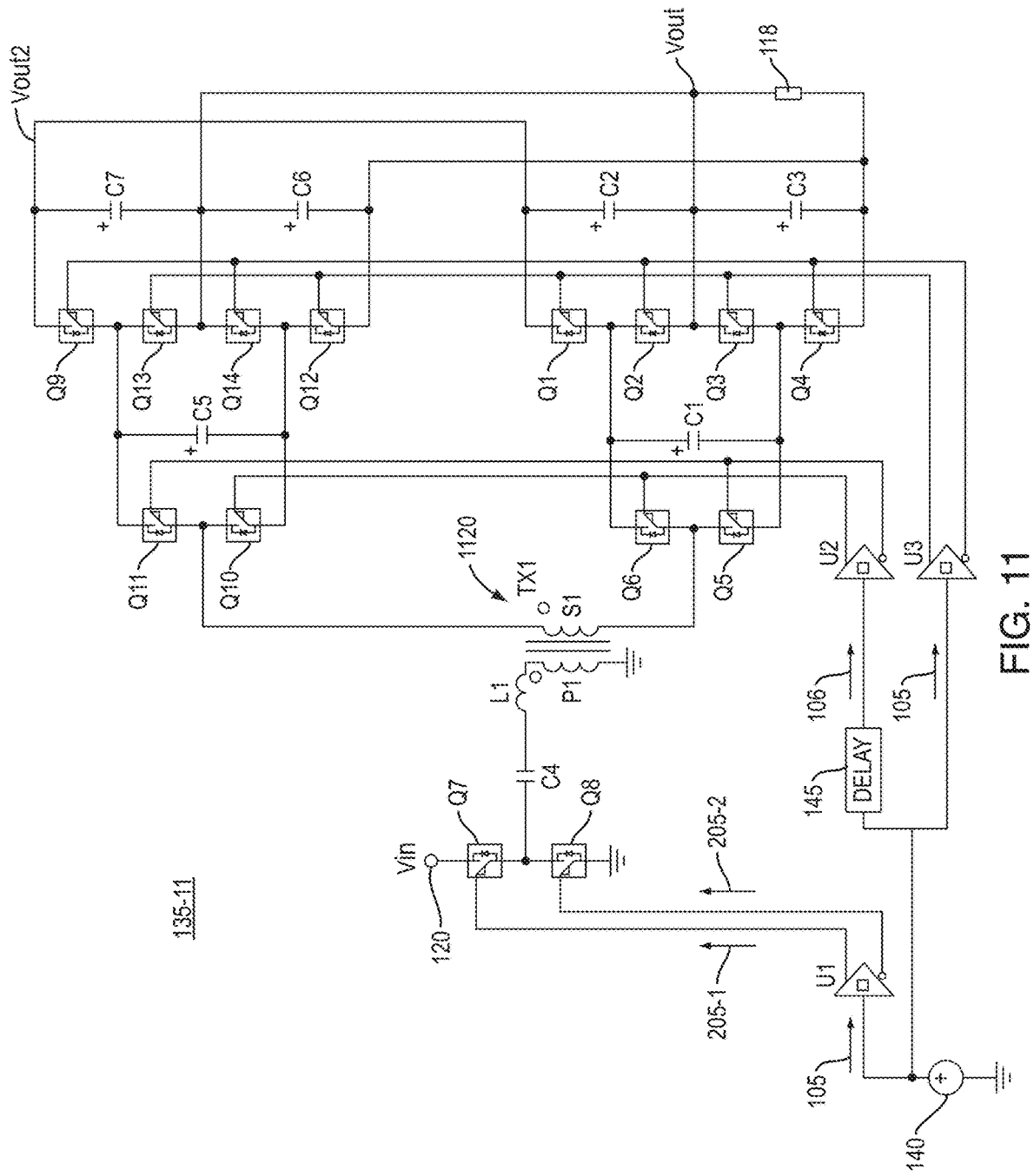

HYBRID RESONANT POWER SUPPLY

BACKGROUND

As its name suggests, a conventional power converter converts a received input voltage into an output voltage.

In power conversion, serial LC (inductor-capacitor) tank circuits have close to unity voltage gain when operated at a respective resonance frequency. That is, the magnitude of the output voltage is equal to a magnitude of the input voltage. This occurs because series impedance is very small (that's the definition of resonance) and do not limit the current flow. Thus, conventional LC power systems are unable to regulate wide input/output range and must have a pre-regulator plus a relatively constant output voltage.

A conventional LC based resonant converter can be operated at a frequency other than at a resonant frequency. However, such operation is not without issues such as limited gain change (+−20%) and increase of RMS current with the associated increase of losses.

BRIEF DESCRIPTION

This disclosure includes the observation that conventional LLC converters can be implemented in only limited applications because of lack of sufficient gain control. In contrast to conventional techniques, embodiments herein include novel ways of providing improved performance (such as providing better gain control) of power supplies and more efficient generation of a corresponding output voltage.

More specifically, according to one embodiment, a power supply system comprises: a first stage, a second stage, and a phase delay circuit. The first stage includes a resonant power supply circuit operable to derive an intermediate voltage from an input voltage. The phase delay circuit is coupled between the first stage (such as an input stage) and the second stage (such as an output stage) of the power supply. During operation, the phase delay circuit applies a phase delay of the intermediate voltage generated by the resonant circuit. The second stage receives the phase delayed intermediate signal and derives an output voltage to power a load. In one embodiment, a magnitude of the delay applied by the phase delay circuit as further discussed herein controls a gain of the power converter circuit.

Note that the phase delay circuit can be configured in any manner or include any suitable resources to control a phase delay of the intermediate voltage. For example, in one embodiment, the phase delay circuit includes a half bridge rectifier circuit to control different phase delays applied to the intermediate voltage. In one embodiment, the intermediate signal is fed into one side (switches receiving the intermediate signal) of a half bridge rectifier.

In accordance with further embodiments, the power supply as described herein includes a controller operable to control a magnitude of the delay provided by the phase delay circuit. As previously discussed, controlling the magnitude of the delay applied to the intermediate voltage (signal) controls a gain of the output voltage with respect to the input voltage. Accordingly, embodiments herein include a controllable resonant LLC power supply (such as a resonant power supply circuit or LC topology power converter).

In yet further embodiments, the phase delay circuit is operable to toggle a polarity of connecting a capacitor in series between the first stage and the second stage. More specifically, in one embodiment, the first stage of the power supply includes a resonant circuit in which a corresponding circuit path of the first stage includes an inductor connected in series with a first capacitor; the phase delay circuit includes a second capacitor selectively connected in series with the circuit path between the first stage and the second stage.

In still further embodiments, the phase delay circuit as described herein can be configured to include: a capacitor and multiple switches. In such an instance, a controller of the power supply is operable to control timing and respective states of the multiple switches, which controls a gain of the output voltage with respect to the input voltage. In one embodiment, the controller controls the phase delay circuit via a pulse width modulation control signal, variations of which control the delay associated with the intermediate voltage.

In yet further embodiments, an overall gain of the output voltage with respect to the input voltage is based on a combination of first gain provided by the resonant circuit in the first stage and second gain controlled by a pulse width modulation control signal inputted to the phase delay circuit. In one embodiment, the phase delay circuit supports wide gain control. Thus, certain embodiments herein include implementing a resonance circuit with wide gain control capability to convert a received input voltage into an output voltage.

These and other more specific embodiments are disclosed in more detail below.

Note that any of the resources implemented in the power supply as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate control of a power supply. The instructions, when executed by computer processor hardware, cause the computer processor hardware (such as one or more co-located or disparately located processor devices or hardware) to: produce an intermediate voltage from an input voltage; control a phase delay of the intermediate voltage generated by the resonant circuit; and derive an output voltage to power a load from the phase delayed intermediate voltage.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to controlling operation of a switched-capacitor converter, the concepts disclosed herein may be advantageously applied to any other suitable topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 11 is an example detailed diagram illustrating a controllable resonant power supply including a transformer according to embodiments herein.

Figure 1:
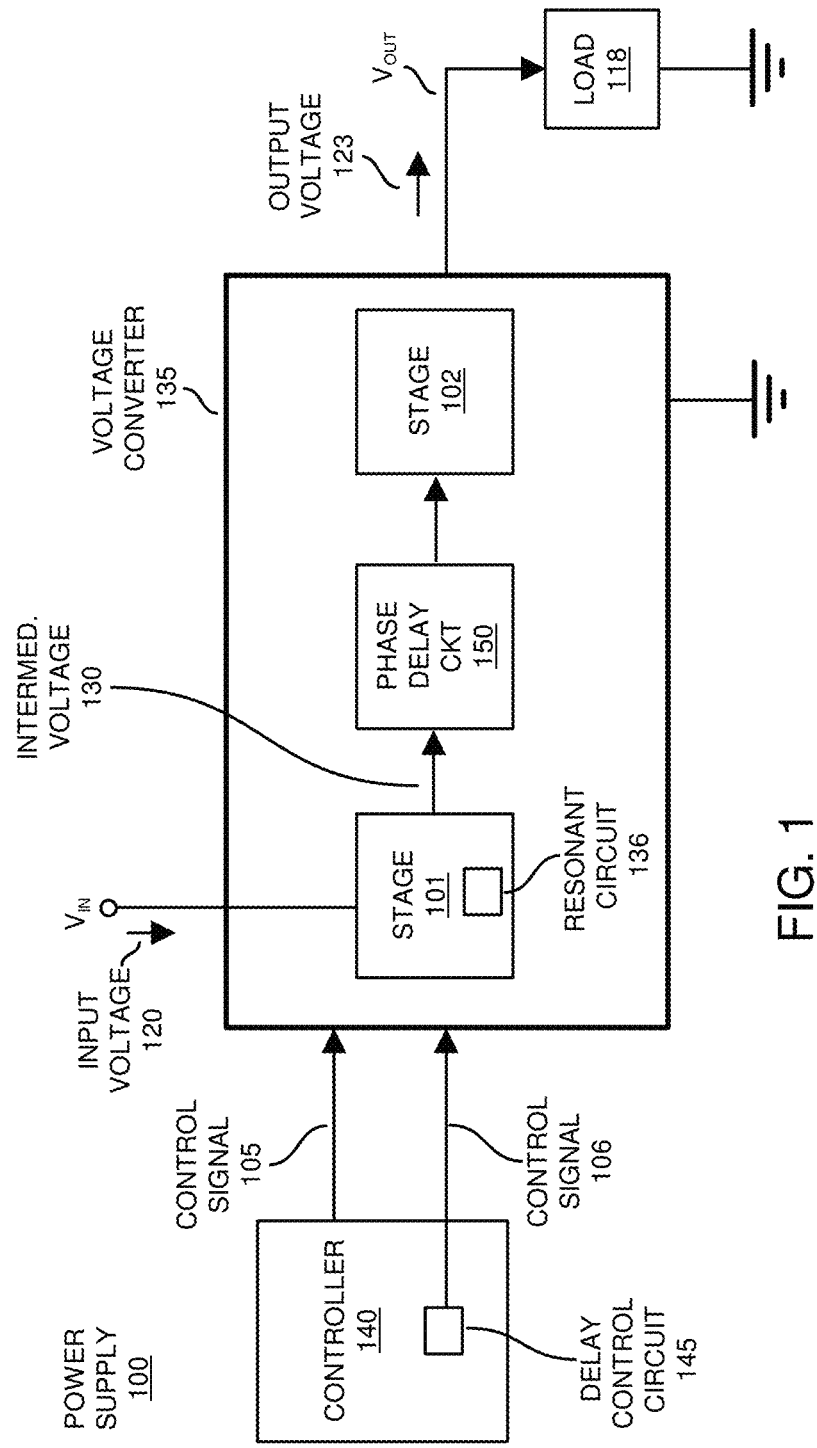
FIG. 1 is an example diagram illustrating a hybrid inductor-capacitor (LC) power supply according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As previously discussed, according to one embodiment, a power supply system comprises: a first stage, a phase delay circuit, and a second stage. The first stage includes a resonant power supply circuit operable to derive an intermediate voltage from an input voltage. The phase delay circuit is coupled between the first stage and the second stage of the power supply. During operation, the phase delay circuit applies phase delay control to the intermediate voltage generated by the resonant circuit. The second stage receives the phase delayed intermediate voltage and derives an output voltage to power a load. In one embodiment, a controller in communication with the phase delay circuit controls an amount of delay applied to the intermediate voltage produced by a resonant circuit. Via the control of the delay, the controller controls the gain (such as Vout/Vin) associated with the power converter circuit.

Now, with reference to the figures, FIG. 1 is an example diagram illustrating a power supply including a switched-capacitor converter according to embodiments herein.

As shown in this example embodiment, power supply 100 (such as an AC to DC voltage converter) includes a controller 140 and voltage converter 135. Voltage converter 135 includes stage 101, phase delay circuit 150, and stage 102. The output voltage 123 produced by the voltage converter 135 powers the load 118.

In one embodiment, controller 140 includes delay control circuit 145, which can reside at disparate locations.

Further in this example embodiment, stage 101 includes resonant circuit 136 (a.k.a., resonant power supply circuit).

Note that each of the resources as described herein can be instantiated in any suitable manner. For example, each of the controller 140, delay control circuit 145, etc. can be instantiated as hardware (such as circuitry), software (executed instructions), or a combination of both.

In furtherance of producing the output voltage 123 within a desired voltage range, during general operation, controller 140 produces control signals 105 and 106 to control operation of voltage converter 135.

In one non-limiting example embodiment, a frequency of the control signals (such as control signal 105, control signal 106, etc.) produced by the controller 140 is tuned or set to match an LC time constant associated with the resonant circuit 136.

As its name suggests, via the control signals 105 and 106, the voltage converter 135 converts the input voltage 120 into the output voltage 123. More specifically, in one embodiment, the voltage converter 135 receives the input voltage (Vin, such as a DC or AC input voltage) and converts it into the output voltage 123 (Vout, such as a DC output voltage). As further discussed herein, the control signals control switching in the voltage converter 135 and corresponding gain of converting the input voltage 120 into the output voltage 123.

In this example embodiment, the output voltage 123 powers the load 118. However, note that the voltage converter 135 can be configured to produce multiple output voltages (such as including Vout2) can be used to drive load 118.

As further shown, the first stage 101 (resource such as circuitry) includes a resonant (power supply) circuit 136 operable to derive an intermediate voltage 130 from an input voltage 120. As its name suggests, the resonant circuit 136 operates at a resonant frequency to produce the intermediate voltage 130.

In this example embodiment, the phase delay circuit 150 is coupled between the first stage 101 (such as an input stage) and the second stage 102 (such as an output stage) of the power supply 100. During operation, in accordance with the control signal 105, the phase delay circuit 150 applies a phase delay to the intermediate voltage 130 generated by the resonant circuit 136. The second stage 102 receives the phase delayed intermediate voltage 130 (signal) and, from it, derives an output voltage 123 that powers load 118.

In one embodiment, the phase delay circuit 150 (phase shifter) supports linear gain control.

As further discussed herein, the phase delay circuit 150 can be configured to include any suitable resources to control a phase delay applied to the intermediate voltage 130. For example, in one embodiment, as further discussed herein, the phase delay circuit 150 includes a half bridge rectifier circuit to apply/control different phase delays to the intermediate voltage 130.

In accordance with further embodiments, in addition to producing the control signal 105, note that the controller 140 (via delay control circuit 145) controls a magnitude of the delay provided by the phase delay circuit 150. In one embodiment, controlling the magnitude of the delay applied to the intermediate voltage 130 (signal) controls a gain of a magnitude of the output voltage 123 with respect to a magnitude of the input voltage. In other words, via different settings of the delay applied (via delay control circuit 145) to the phase delay circuit 150 and corresponding intermediate voltage 130, the controller 140 is able to provide wide gain regulation with respect to conventional techniques. Accordingly, embodiments herein include a controllable resonant LLC power supply (such as a resonant power supply circuit or LC topology power converter) capable of producing an output voltage 123 having a wide range of magnitudes depending on settings of control signals 105 and 106.

These and other more specific embodiments are disclosed in more detail below.

Figure 2:
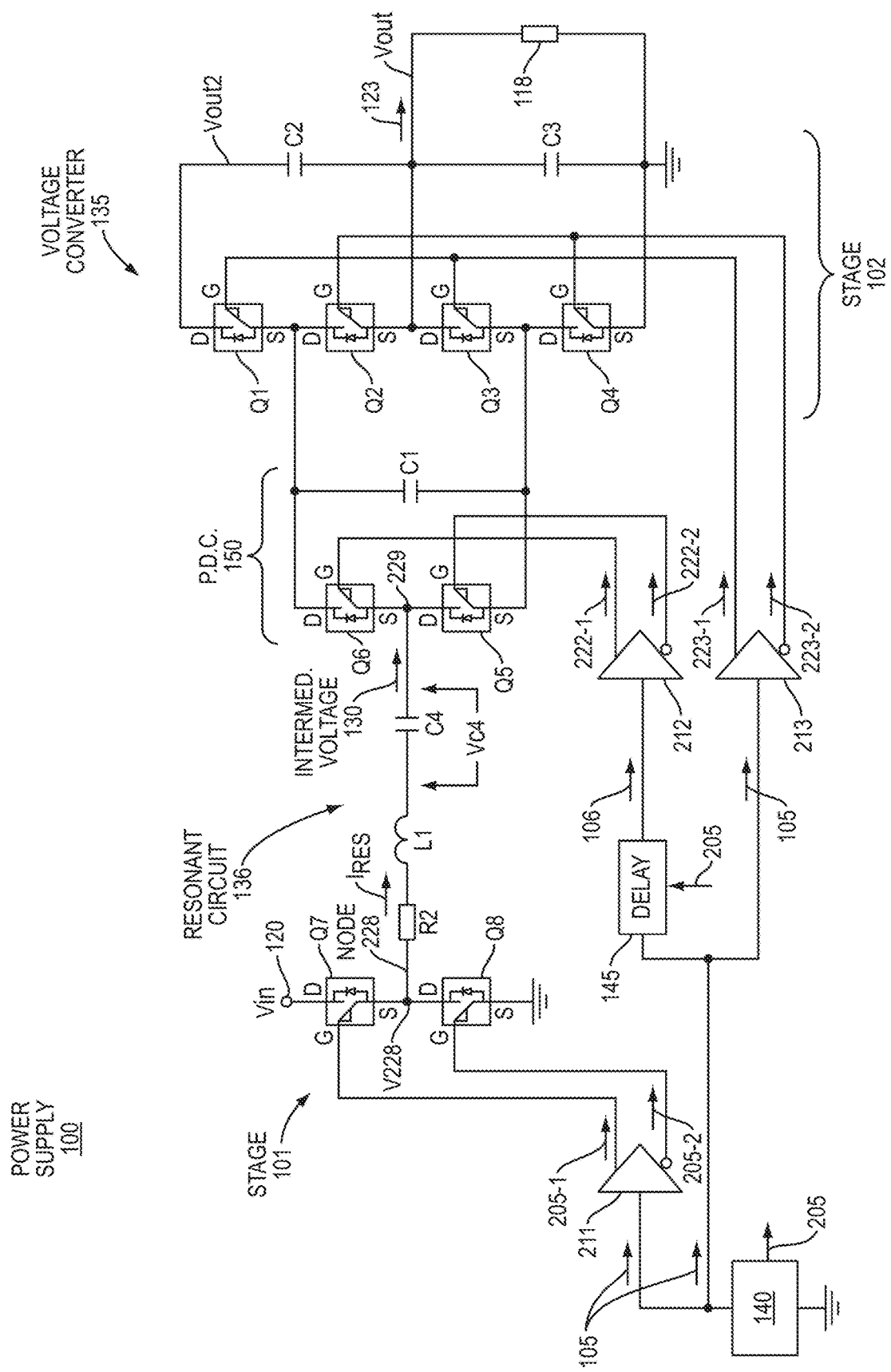
FIG. 2 is an example more detailed diagram illustrating a controllable resonant power supply according to embodiments herein.

FIG. 2 is an example more detailed diagram illustrating a power supply according to embodiments herein.

In this example embodiment, power supply 100 includes a controller 140, delay control circuit 145, driver 211, driver 212, driver 213, switch Q1, switch Q2, switch Q3, switch Q4, switch Q5, switch Q6, switch Q7, and switch Q8. Power supply 100 further includes resistor R2, inductor L1, capacitor C4, capacitor C1, capacitor C2, capacitor C3.

As previously discussed, the power supply 100 produces output voltage 123 that powers load 118.

In one embodiment, the capacitance associated with capacitor C4 (such as one nanofarad) is substantially less than the capacitance of each of the capacitors C1, C2, and C3 (such as each being one microfarad). However, note that the settings of perspective capacitors C1, C2, C3, and C4 can vary depending on the embodiment.

Note that the switches Q1-Q8 can be any suitable type of resource. For example, in one embodiment, each of the switches Q1-Q8 is a field effect transistor. Alternatively, each of the switches Q1-Q8 can be instantiated as a bipolar junction transistor or other suitable device.

As further shown, during operation, controller 140 produces control signal 105 (such as a pulse width modulation control signal) inputted to multiple components including driver 211, delay control circuit 145, and driver 213.

In this example embodiment, driver 211 receives control signal 105 and produces a respective output including control signal 205-1 and control signal 205-2. In one embodiment, control signal 205-1 (such as a pulse width modulation control signal) is substantially the same as control signal 105. Control signal 205-2 is an inversion of the control signal 105. That is, when control signal 105 is logic high, control signal 205-2 is a logic low; conversely, when control signal 105 is logic low, control signal 205-2 is a logic high.

Driver 213 also receives control signal 105 and produces a respective output including control signal 223-1 and control signal 223-2. In one embodiment, control signal 223-1 (such as a pulse width modulation control signal) is substantially the same as control signal 105. Control signal 223-2 is an inversion of the control signal 105. That is, when control signal 105 is logic high, control signal 205-2 is a logic low; conversely, when control signal 105 is logic low, control signal 205-2 is a logic high.

Controller 140 also produces control signal 205. Via control signal 205, the controller 140 controls a magnitude of the delay applied by the delay control circuit 145 to the switches Q5 and Q6 (on an input side receiving the intermediate voltage 130) of the half bridge rectifier circuit relative to control of the switches Q2 and Q3 on an output side of the half bridge rectifier. Note that the control signal 205 can be any suitable information, signal, data, etc., that controls the delay applied to the control signal 105 to produce the control signal 106 (time delayed rendition of control signal 105).

Driver 212 receives control signal 106 (delayed version of control signal 105) and produces a respective output including control signal 222-1 and control signal 222-2. In one embodiment, control signal 222-1 (such as a pulse width modulation control signal) is substantially the same as control signal 106. Control signal 222-2 is an inversion of the control signal 106. That is, when control signal 106 is logic high, control signal 222-2 is a logic low; conversely, when control signal 106 is logic low, control signal 222-2 is a logic high.

In this example embodiment, stage 101 of the power supply 100 includes switch Q7, Q8, resistor R2, inductor L1, capacitor C4. Resonant circuit 136 includes inductor L1 and capacitor C4.

Further in this example embodiment, control signal 205-1 drives the gate node of switch Q7. The drain node of switch Q7 is connected to the input voltage 120. The source node of switch Q7 and the drain node of switch Q8 are both coupled to node 228.

Control signal 205-2 drives the gate node of switch Q8. The source node of switch Q8 is connected to ground.

In accordance with control signal 105, and corresponding combination of control signals 205-1 and 205-2, the controller 140 controls switch Q7 and switch Q8 to switch between connecting node 228 to the input voltage 120 and connecting node 228 to a ground reference voltage.

The switching of switch Q7 and switch Q8 provides energy to resonant circuit 136, which includes inductor L1 and capacitor C4.

Ires represents the amount of current passing through the resonant circuit 136 (such as including resonant circuit path comprising resistor R2, inductor L1, and capacitor C4) between node 228 and node 229.

Voltage Vc4 in this example embodiment represents a magnitude of the voltage across the capacitor C4.

As further discussed herein, controlled switching of switches Q7 and Q8 associated with the resonant circuit 136 produces the intermediate voltage 130 (such as a rectified voltage) at node 229. Accordingly, the controller 140 controls stage 101 to produce the intermediate voltage 130, which is inputted to the phase delay circuit 150.

Further in this example embodiment, the phase delay circuit 150 (receiving the intermediate voltage 130) includes switch Q5, switch Q6, and capacitor C1. Switches Q5 and Q6 are controlled by respective control signals 222-1 and 222-2 outputted from the driver 212.

More specifically, the driver 212 produces control signal 222-1 that drives the respective gate of switch Q6. Additionally, the driver 212 produces control signal 222-2 that drives the gate of switch Q5. As previously discussed, via the delay control circuit 145, the control signals 222-1 and 222-2 are delayed with respect to control signal 105 controlling switches Q7 and Q8.

Via delayed control of switches Q5 and Q6, as its name suggests, the phase delay circuit 150 controls an amount of delay applied to the intermediate voltage 130, prior to being conveyed to stage 102.

Note that implementation of phase delay circuit 150 is shown by way of a non-limiting example embodiment only. Phase delay circuit 150 can be configured with any suitable components or circuitry facilitating phase shifting of intermediate signal 130 in order to provide gain control of the voltage converter 135.

As further shown, and as previously discussed, the driver 213 produces control signals 223-1 and 223-2 to control respective states of switches Q1, Q2, Q3, Q4 (such as charge pump circuitry integrated into a half bridge rectifier of the phase delay circuit 150) in stage 102. As a more specific example, control signal 223-1 outputted from the driver 213 is inputted to the gate node of switch Q1 as well as the gate node of switch Q3; control signal 223-2 outputted from the driver 213 is inputted to the gate node of switch Q2 as well as the gate node of switch Q4. Control of the switches Q1-Q4 converts the delayed intermediate voltage 130 into one or more output voltages such as output voltage Vout (123) and output voltage Vout2.

Accordingly, switches Q1 and Q3 are activated and deactivated at the same time. Switches Q2 and Q4 are activated and deactivated at the same time.

As shown in subsequent drawings (such as the timing diagram in FIG. 3 and the different phases of operating the power supply 100 in FIGS. 4-7), the voltage converter 135 converts the input voltage 120 into a respective output voltage 103 that powers a load 118.

In one embodiment, as further discussed below, the phase delay circuit 150 is operable to toggle a polarity of connecting a capacitor C1 in series between the first stage 101 and the second stage 102. Toggling of the capacitor C1 balances a respective stored voltage, reducing or eliminating drift that can otherwise occur with respect to the voltage stored on capacitor C1. In other words, toggling of the capacitor C1, maintains the corresponding voltage as a substantially constant or fixed value.

In one embodiment, the first stage 101 of the power supply 100 as shown in FIG. 2 includes a resonant circuit 136 in which a corresponding a resonant circuit path 136 of the first stage 101 includes an inductor L1 connected in series with a first capacitor C4; the phase delay circuit 150 includes a second capacitor (C1) selectively connected in series with the circuit path between the first stage 101 and the second stage 102.

Note further that embodiments herein show how to operate the voltage converter 135 in an open loop control mode. Note that the voltage converter 135 as described herein can be operated in a closed loop mode. For example, if desired, the controller 140 can be configured to monitor feedback such as a magnitude of the output voltage 123 and, based on such feedback, apply control adjustments (such as timing adjustments to the delay control circuit 145) to maintain the output voltage 123 within a desired magnitude range.

Figure 3:
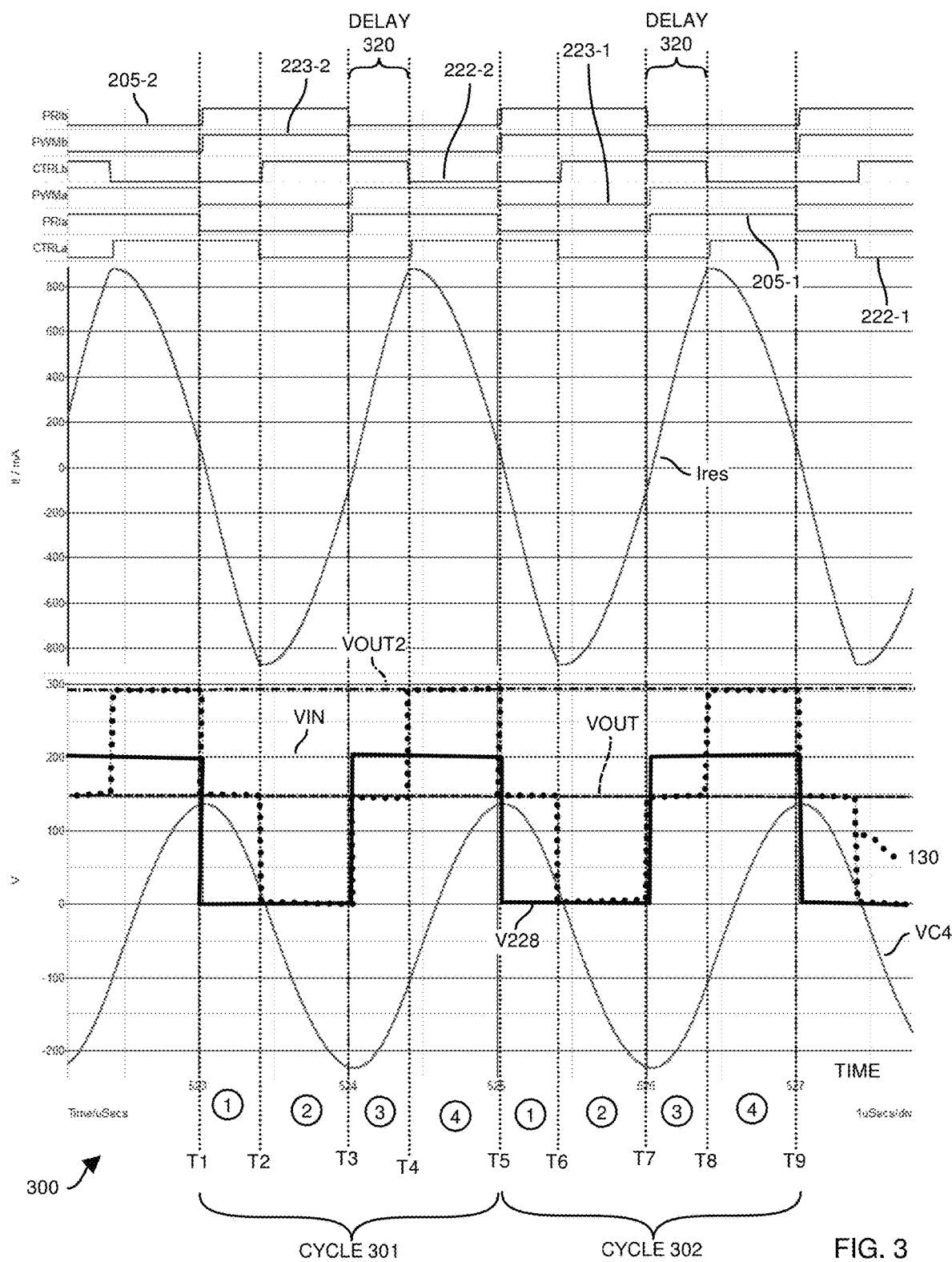
FIG. 3 is an example timing diagram associated with operation of a power supply according to embodiments herein.

FIG. 3 is an example timing diagram associated with operation of a power supply according to embodiments herein.

As previously discussed, the phase delay circuit 150 as described herein can be configured to include: a capacitor C1 and multiple switches Q5 and Q6. In such an instance, the controller 140 of the power supply 100 is operable to control states of the multiple switches Q5 and Q6, which controls a gain of the output voltage 123 with respect to the input voltage 120.

In one embodiment, the controller 140 controls the phase delay circuit 150 via generation of pulse width modulation control signals 222-1, 222-2, 223-1, and 223-1, variations or settings of which control the delay associated with the intermediate voltage 130.

In this example embodiment, the timing diagram 300 illustrates different states of the control signals (205-1, 205-2, 222-1, 222-2, 223-1, and 223-2) derived from control signals 105 and 106. As previously discussed, the controller 140 controls a respective gain (ratio of the magnitude of the output voltage with respect to the magnitude of the input voltage 120) associated with the voltage converter 135 via an amount of phase delay provided by phase delay circuit 145.

In one embodiment, the controller 140 controls the amount of delay provided by the delay control circuit 145 to control an overall gain of the voltage converter 135.

In accordance with further embodiments, the overall gain of the output voltage 123 with respect to the input voltage 120 is based on a combination of first gain provided by the resonant circuit 136 in the first stage 101 and second gain controlled by pulse width modulation control signals such control signals 222-1 and 222-2 inputted to the phase delay circuit 150.

Embodiments herein include implementing a resonant circuit 136 and phase delays in order to provide wide gain control capability to convert a received input voltage 120 into an output voltage 123.

In this example embodiment, the timing diagram 300 further illustrates a relative timing of respective control signals, each of which toggles between respective high and low states. Note that a logic high setting of a control signal activates a switch to an ON state (providing a low impedance path between a respective drain node and source node) of the respective switch; a logic low setting of a control signal deactivates a switch to an OFF state (providing a high impedance path between a respective drain node and source node) of the respective switch.

As previously discussed, and as shown in timing diagram 300, control signal 205-1 (a.k.a., PRIa) drives the gate node of switch Q7.

Control signal 205-2 (a.k.a., PRIb) drives the gate node of switch Q8.

Control signal 222-1 (a.k.a., CTRLa) drives the gate node of switch Q6.

Control signal 222-2 (a.k.a., CTRLb) drives the gate node of switch Q5.

Control signal 223-1 (a.k.a., PWMa) drives both the gate node of switch Q1 and the gate node of switch Q3.

Control signal 223-2 (a.k.a., PWMb) drives both the gate node of switch Q2 and the gate node of switch Q4.

Delay 320 in timing diagram 300 represents an amount of delay selected by controller 140 and applied by delay control circuit 145. More specifically, control signal 222-1 is delayed by an amount of delay 320 with respect to control signal 223-1. Similarly, control signal 222-2 is delayed by an amount of delay 320 with respect to control signal 223-2.

As previously discussed, the magnitude of delay 320 (such as around 400 nanoseconds in this example embodiment) as controlled by the controller 140 contributes to control of an overall gain of the voltage converter 135 and therefore the magnitude of the output voltage 123.

Note that if the delay applied by the delay control circuit 145 were zero instead of 400 nanoseconds, in such an instance, the magnitude of the output voltage 123 produced by the voltage converter 135 would be substantially equal to the magnitude of the input voltage 120 (e.g., gain=Vout/Vin=1). Note further that increasing the magnitude of the delay above zero increases the voltage gain of the voltage converter 135. That is, the ratio of the output voltage 123 to the input voltage 120 increases for larger delay times greater than the zero nanosecond delay setting.

Note that timing diagram 300 also illustrates the flow of current (Ires) through the resonant circuit path 136 relative to timing of switching associated with respective control signals 105 and 205. Voltage Vc4 represents (such as a sine wave or pseudo sine wave) represents a magnitude of the voltage across capacitor C4 in resonant circuit path 136.

Timing diagram 300 further illustrates that the input voltage 120 in this example embodiment is a DC voltage of approximately 200V, although this magnitude can vary depending on the embodiment. In one embodiment, power supply 100 as described herein supports AC/DC conversion, so all primary voltages are between 100V and 400V. However, note that this is shown by way of a non-limiting example embodiment only; the primary input voltage can be any suitable value such as >1000V and low below 60V.

Output voltage Vout (123) in this example embodiment is a DC voltage of approximately 150 VDC, although this magnitude can vary depending on the embodiment.

Output voltage Vout2 in this example embodiment is a DC voltage of approximately 300 VDC, although this magnitude can vary depending on the embodiment.

Voltage V228 represents the voltage at node 228 of the power supply 100. Based on ON/OFF control of switches Q7 and Q8 in a manner as previously discussed via control signals 205-1 and 205-2, the voltage at node 228 switches between 0 and 200 VDC.

Timing diagram 300 further shows the intermediate voltage 130 as being a square wave signal or pseudo-square wave voltage signal whose magnitude varies amongst multiple voltage steps including 0 VDC, 150 VDC, and 300 VDC.

Each cycle (such as cycle 301, cycle 302, etc.) as shown in timing diagram 300 includes four phases, namely, phase #1, phase #2, phase #3, and phase #4. Each of the cycles as further discussed below with respect to FIGS. 4-7.

Figure 4:
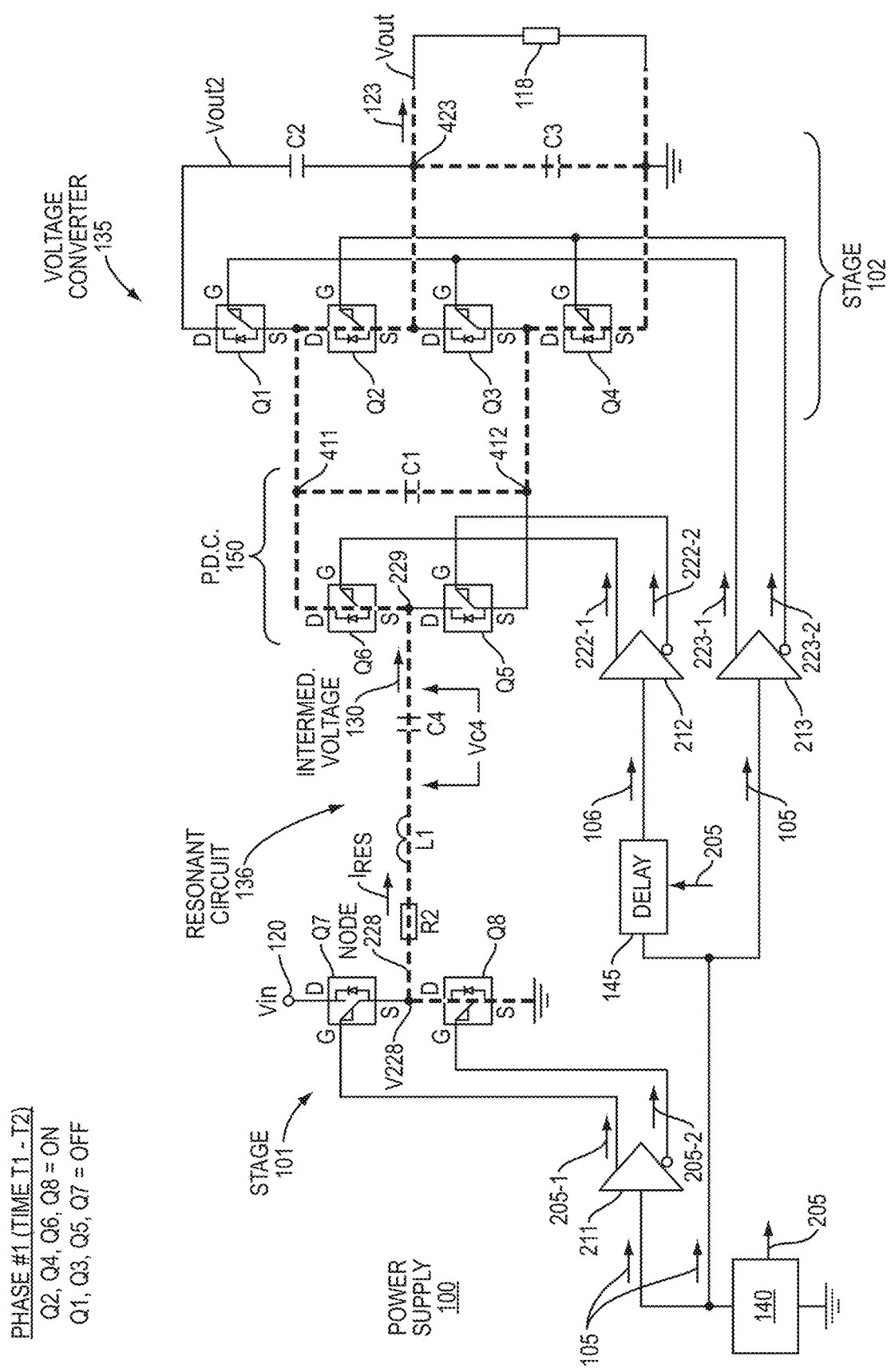
FIG. 4 is an example diagram illustrating a first operational state (such as first phase) of a power supply according to embodiments herein.

FIG. 4 is an example diagram illustrating a first operational state (such as phase #1) of a power supply according to embodiments herein.

During phase #1, between time T1 and time T2 (of the timing diagram 300 in FIG. 3), switches Q2, Q4, Q6, and Q8 are set to an ON state, while switches Q1, Q3, Q5 and Q7 are set to an OFF state via respective control signals produced by drivers 211, 212, and 213.

In such an instance, between time T1 and time T2, the node 228 is connected to ground.

Additionally, between time T1 and time T2, switch Q6 is activated such that the capacitor C1 is connected in series with inductor L1 and capacitor C4. Activation of switch Q2 connects node 411 of the capacitor C1 to the output voltage node 423. Activation of switch Q4 connects node 412 of the capacitor C1 to ground.

Figure 5:
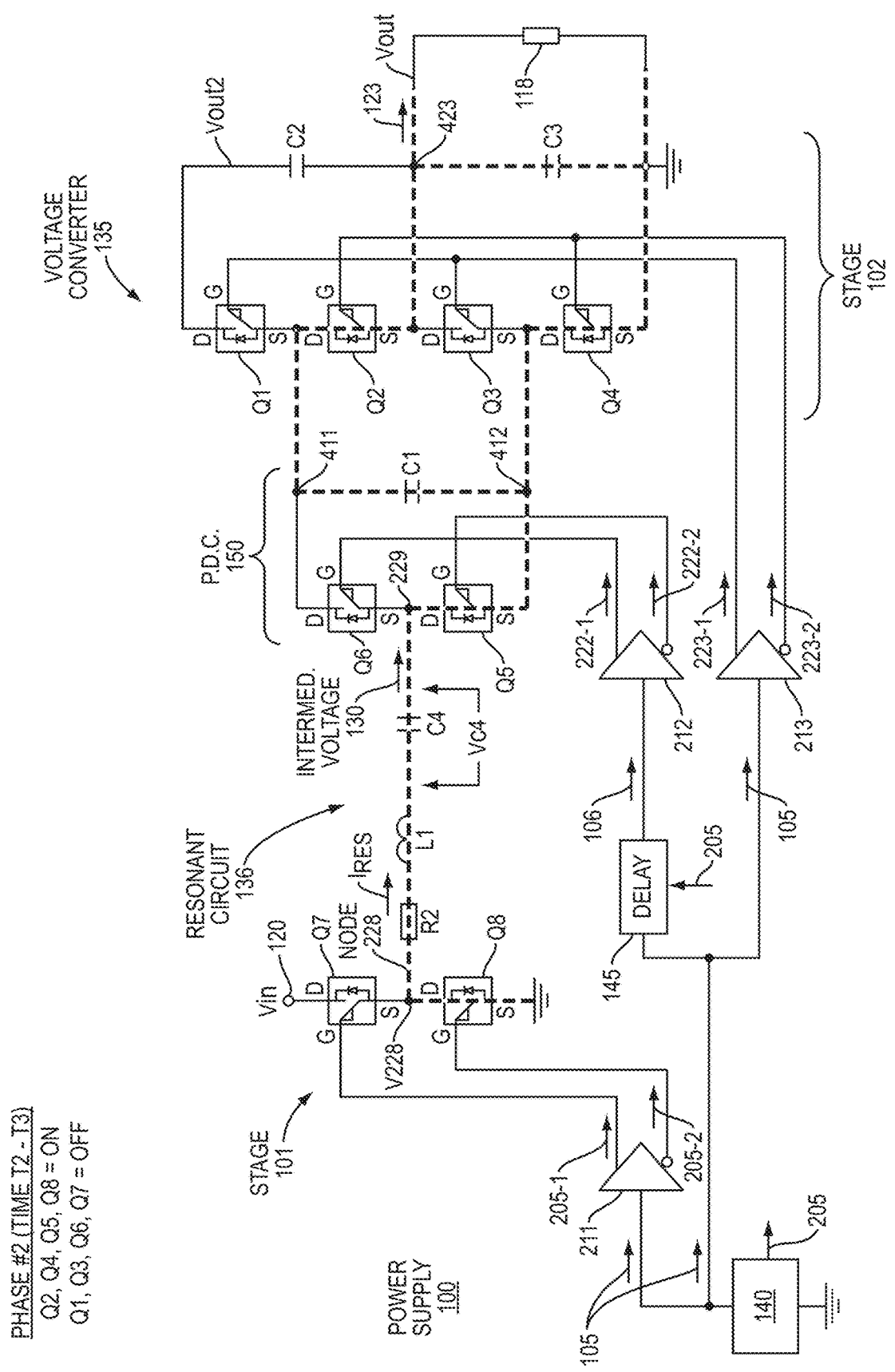
FIG. 5 is an example diagram illustrating a second operational state (such as second phase) of a power supply according to embodiments herein.

FIG. 5 is an example diagram illustrating a second operational state (such as phase #2) of a power supply according to embodiments herein.

During phase #2, between time T2 and time T3 (of the timing diagram 300 in FIG. 3), switches Q2, Q4, Q5, and Q8 are set to an ON state via control signals 205-2, 222-2, and 223-2, while switches Q1, Q3, Q6 and Q7 are set to an OFF state via respective control signals 205-1, 222-1, and 223-1 produced by drivers 211, 212, and 213.

In such an instance, between time T2 and time T3, the node 228 is connected to ground via activation of switch Q8.

Additionally, between time T2 and time T3, switch Q5 is activated such that the capacitor C1 is connected in series with inductor L1 and capacitor C4. As further shown, activation of switch Q2 connects node 411 of the capacitor C1 to the output voltage node 423; activation of switch Q4 connects node 412 of the capacitor C1 to ground.

Figure 6:
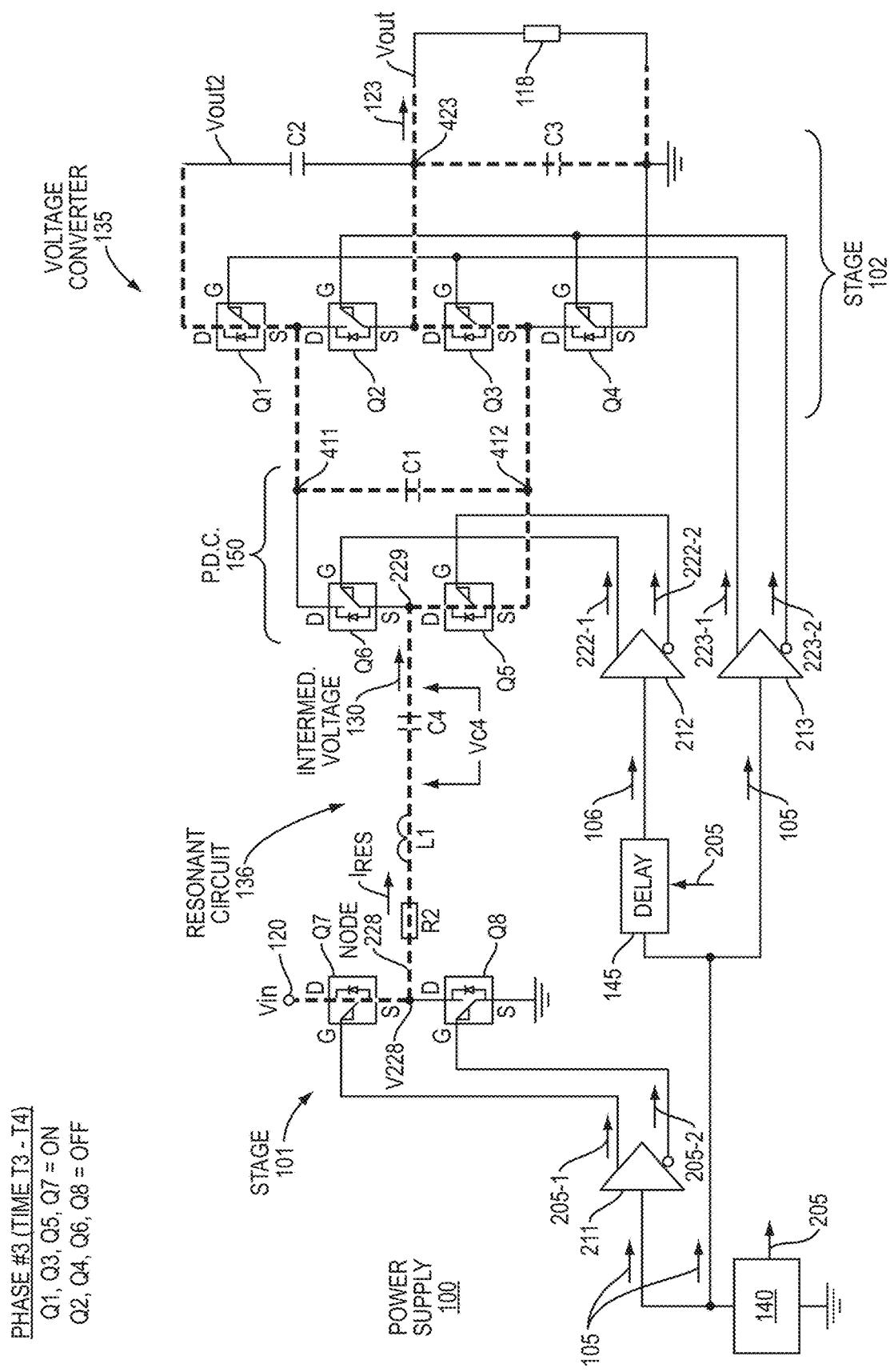
FIG. 6 is an example diagram illustrating a third operational state (such as third phase) of a power supply according to embodiments herein.

FIG. 6 is an example diagram illustrating a third operational state (such as phase #3) of a power supply according to embodiments herein.

During phase #3, between time T3 and time T4 (of the timing diagram 300 in FIG. 3), switches Q1, Q3, Q5, and Q7 are set to an ON state, while switches Q2, Q4, Q6 and Q8 are set to an OFF state via respective control signals produced by drivers 211, 212, and 213.

In such an instance, between time T3 and time T4, the node 228 is connected to input voltage 120 (Vin).

Additionally, between time T3 and time T4, switch Q5 is activated such that the capacitor C1 is connected in series with inductor L1 and capacitor C4. Activation of switch Q1 connects node 411 of the capacitor C1 to the output voltage Vout2. Activation of switch Q3 connects node 412 of the capacitor C1 to the output voltage node 423.

Figure 7:
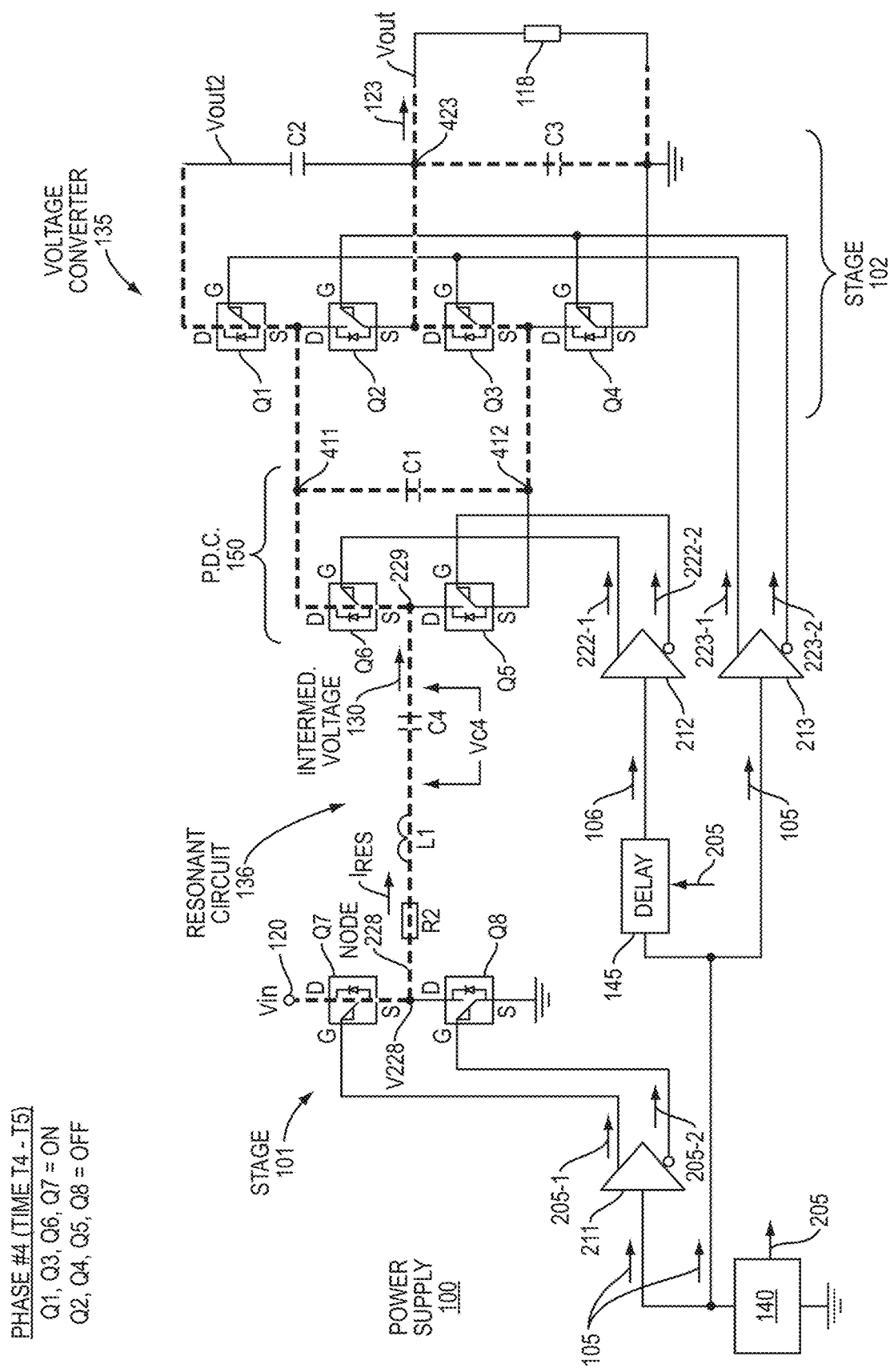
FIG. 7 is an example diagram illustrating a fourth operational state (such as fourth phase) of a power supply according to embodiments herein.

FIG. 7 is an example diagram illustrating a fourth operational state (such as phase #4) of a power supply according to embodiments herein.

During phase #4, between time T4 and time T5 (of the timing diagram 300 in FIG. 3), switches Q1, Q3, Q6, and Q7 are set to an ON state, while switches Q2, Q4, Q5 and Q8 are set to an OFF state via respective control signals produced by drivers 211, 212, and 213.

In such an instance, between time T4 and time T5, the node 228 is connected to the input voltage 120.

Additionally, between time T4 and time T5, switch Q6 is activated such that the capacitor C1 is connected in series with inductor L1 and capacitor C4. Activation of switch Q1 connects node 411 of the capacitor C1 to the output voltage Vout2. Activation of switch Q3 connects node 412 of the capacitor C1 to output voltage node 423.

Figure 8:
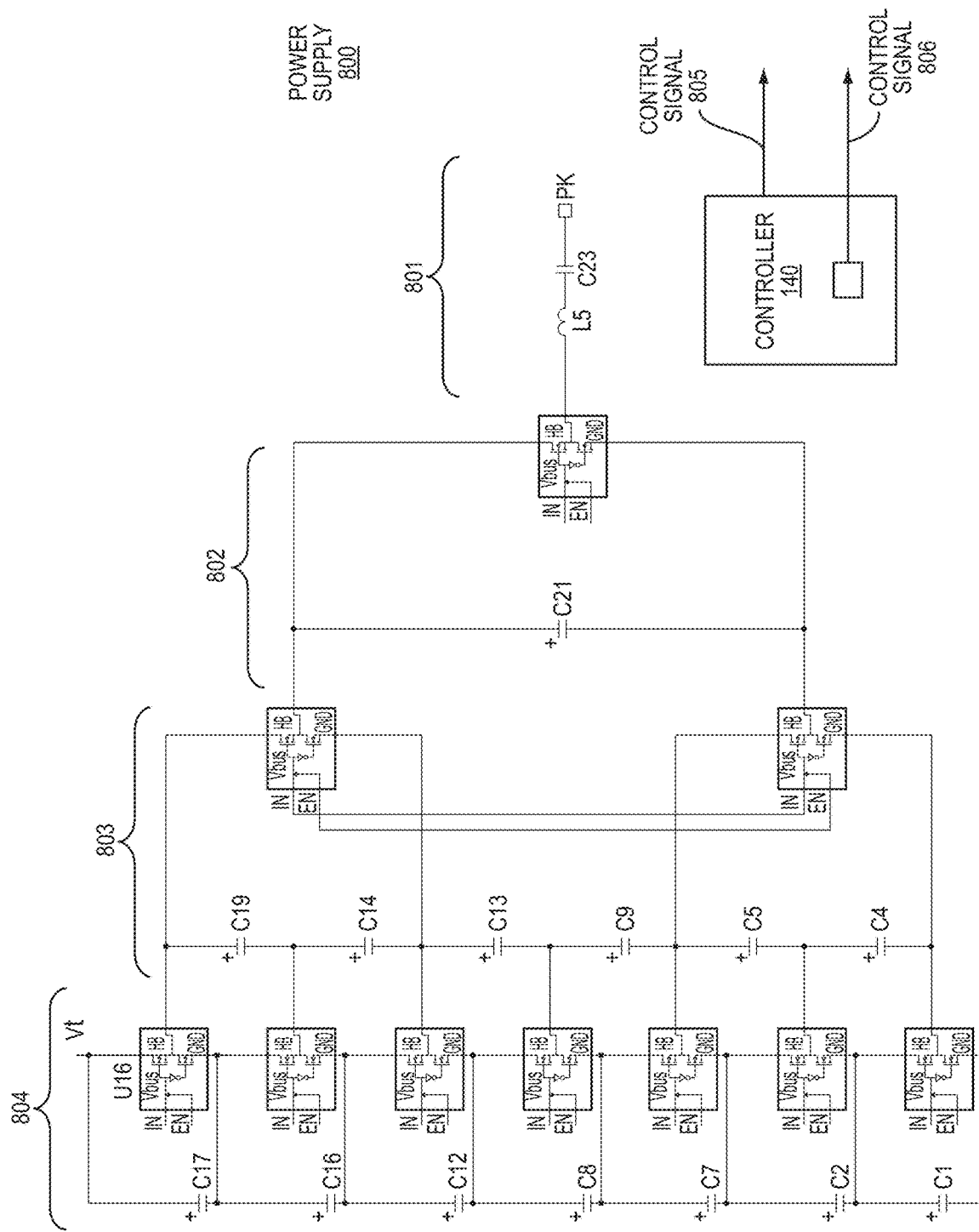
FIG. 8 is an example diagram illustrating a multi-level LCQ rectifier and step down converter according to embodiments herein.

FIG. 8 is an example diagram illustrating a multi-level LCQ rectifier and step down converter according to embodiments herein.

As shown in this example embodiment, the power supply 100 in FIG. 1 is extended to include additional stages. For example, the example power supply 800 in FIG. 8 includes stage 801 (resonant circuit) followed by stage 802 (phase delay circuit). Subsequent stages 803 and 804 operate to produce different output voltages. Controller 140 controls operation of respective switches via control signals 805 and 806 to produce the multiple output voltages.

In this example embodiment, charge pump operation of power supply 800 guarantees that all capacitors output voltages are balanced under all circumstances. The total voltage (Vt) is split across the 7 capacitors C1, C2, C7, C8, C12, C15, and C17. The LC tank oscillates across any pair combination in a hybrid resonance in a similar manner as previously described.

FIG. 11 is a detailed example diagram illustrating a controllable resonant power supply including a transformer according to embodiments herein.

In this instantiation of the power supply 100, the voltage converter 135-11 includes transformer 1120. A combination of capacitor C4, inductor L1, and primary winding P1 of the transformer 1120 represent a resonant circuit driven by combination of the switches Q7 and Q8. The transformer 1102 further includes secondary winding S1.

Secondary winding S1 receives energy from the primary winding P1 and drives switches Q5, Q6, Q10, and Q11 to produce the respective output voltages Vout and Vout2 as shown. Use of the transformer 1120 enables the output voltages to be isolated from the ground reference voltage associated with voltage Vin (120).

Because of the switch count in voltage converter 135-11, it is not necessarily suited for generating voltages at every power level. However, such a configuration is suitable for applications such as telecom/server>2 kW power supplies, where the current multiplier (the charge pump) helps reduce any stress on the transformer 1120.

Figure 9:
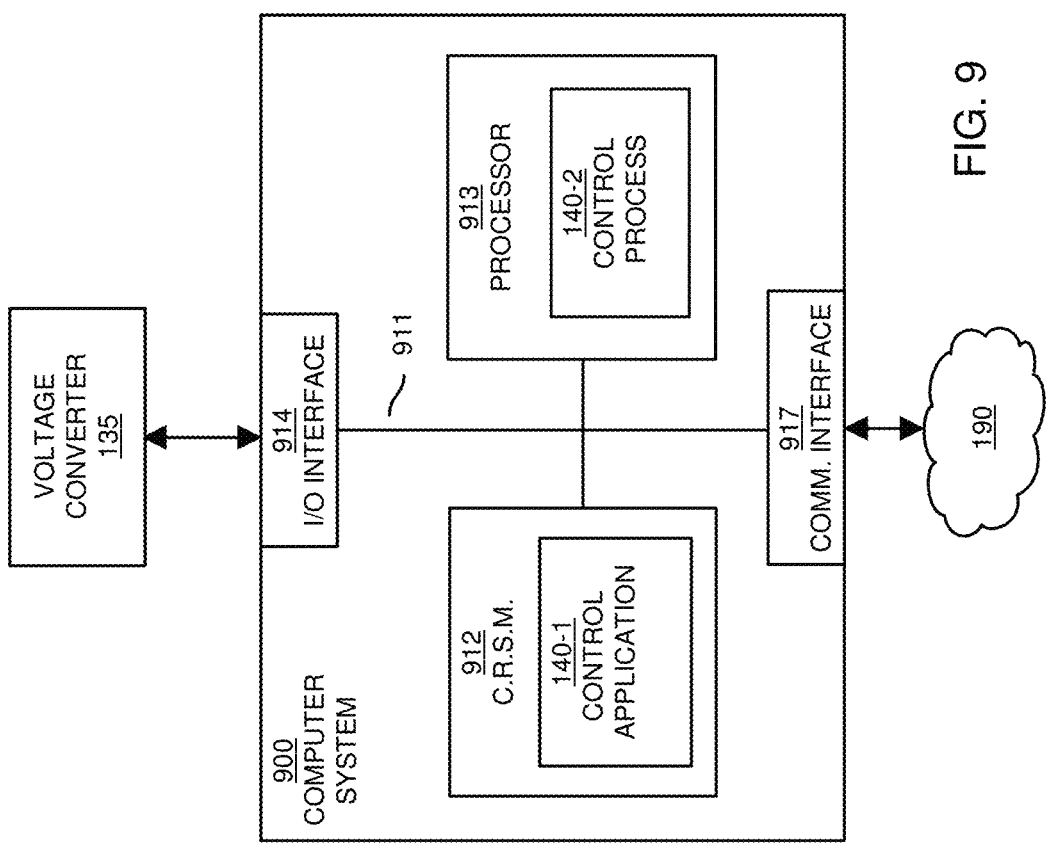
FIG. 9 is an example diagram illustrating example computer architecture operable to execute one or more methods according to embodiments herein.

FIG. 9 is an example diagram illustrating example computer architecture operable to execute one or more methods according to embodiments herein.

As previously discussed, any of the resources (such as controller 140, etc.) as discussed herein can be configured to include computer processor hardware and/or corresponding executable instructions to carry out the different operations as discussed herein.

As shown, computer system 900 of the present example includes an interconnect 911 that couples computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to voltage converter 135.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with control application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in control application 140-1 stored on computer readable storage medium 912. Execution of the control application 140-1 produces control process 140-2 to carry out any of the operations and/or processes as discussed herein.

Those skilled in the art will understand that the computer system 900 can include other processes and/or software and hardware components, such as an operating system that controls allocation and use of hardware resources to execute control application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowchart in FIG. 10. Note that the steps in the flowcharts below can be executed in any suitable order.

Figure 10:
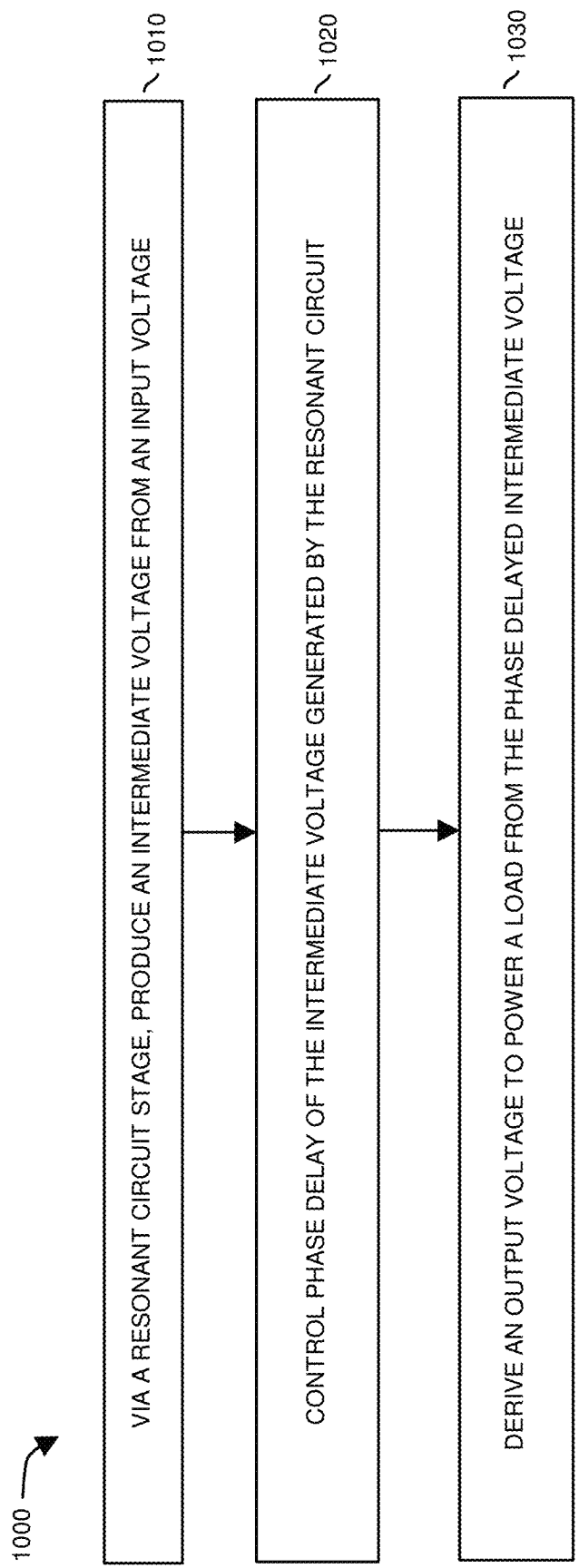
FIG. 10 is an example diagram illustrating a method according to embodiments herein.

FIG. 10 is a flowchart 1000 illustrating an example method according to embodiments herein. Note that there will be some overlap with respect to concepts as discussed above.

In processing operation 1010, via a resonant circuit 136, the first stage 101 of power supply 100 produces an intermediate voltage 130 from an input voltage 120.

In processing operation 1020, the controller 140 controls a phase delay applied to the intermediate voltage 130 generated by the resonant circuit 136.

In processing operation 1030, the second stage 102 of the power supply 100 derives an output voltage 123 to power a load 118 from the phase delayed intermediate voltage 130.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A power supply comprising:
a first stage including a resonant power supply circuit operable to derive an intermediate voltage from an input voltage;
a phase delay circuit coupled between the first stage and a second stage of the power supply, the phase delay circuit operable to receive the intermediate voltage and delay conveyance of the intermediate voltage to the second stage, the intermediate voltage generated by the resonant power supply circuit;
the second stage operable to derive an output voltage to power a load from the delayed intermediate voltage outputted from the phase delay circuit; and
wherein the phase delay circuit includes: a capacitor and multiple switches, the power supply further comprising: a controller operable to control states of the multiple switches, which controls a gain of the output voltage with respect to the input voltage.

2. The power supply as in claim 1, wherein the phase delay circuit includes a half bridge rectifier circuit to phase delay the intermediate voltage.

3. The power supply as in claim 1, wherein the phase delay circuit is operable to toggle a polarity of connecting the capacitor in series between the first stage and the second stage, the capacitor delaying the conveyance of the intermediate voltage to the second stage.

4. The power supply as in claim 1 further comprising:
a controller operable to control a magnitude of the delay provided by the phase delay circuit, wherein the magnitude of the delay controls a gain of the output voltage with respect to the input voltage.

5. The power supply as in claim 1, wherein the second stage includes an output node operative to output the output voltage; and
wherein the controller is operative to switch between a first mode of outputting the intermediate voltage directly from the resonant power supply circuit to the output node and a second mode of outputting the intermediate voltage to the capacitor disposed in series between the resonant power supply circuit and the output node.

6. The power supply as in claim 1, wherein a first switch of the multiple switches is disposed in series between the resonant power supply circuit and the capacitor.

7. The power supply as in claim 1, wherein the phase delay circuit is controlled via a pulse width modulation control signal, variations of which control the delay.

8. The power supply as in claim 1, wherein a magnitude of the delay controls a magnitude of the output voltage.

9. The power supply as in claim 1, wherein the gain of the output voltage with respect to the input voltage is based on a combination of first gain provided by the resonant power supply circuit in the first stage and second gain controlled by a pulse width modulation control signal inputted to the phase delay circuit.

10. The power supply as in claim 1, wherein the capacitor is a first capacitor;
wherein the resonant power supply circuit of the first stage includes a circuit path including an inductor connected in series with a second capacitor; and
wherein the phase delay circuit includes the first capacitor selectively connected in series with the circuit path between the first stage and the second stage.

11. A method comprising:
via a resonant power supply circuit, producing an intermediate voltage from an input voltage;
controlling a phase delay of the intermediate voltage generated by the resonant power supply circuit;
deriving an output voltage to power a load from the phase delayed intermediate voltage; and
wherein controlling the phase delay of the intermediate voltage generated by the resonant power supply circuit includes: alternating an orientation of connecting a capacitor in series with the resonant power supply circuit.

12. The method as in claim 11, wherein controlling the phase delay of the intermediate voltage generated by the resonant power supply circuit includes controlling operation of a half bridge rectifier circuit to phase delay the intermediate voltage.

13. The method as in claim 11, wherein controlling the phase delay of the intermediate voltage includes: toggling a polarity of connecting the capacitor between the first stage and the second stage.

14. The method as in claim 11 further comprising:
controlling a magnitude of the phase delay; and
wherein the magnitude of the phase delay controls a gain of the output voltage with respect to the input voltage.

15. The method as in claim 11, wherein the output voltage is a DC voltage.

16. The method as in claim 11, wherein controlling the phase delay of the intermediate voltage generated by the resonant power supply circuit includes:
controlling states of switches, settings of which control a gain of the output voltage with respect to the input voltage.

17. The method as in claim 11 further comprising:
controlling a magnitude of the phase delay via a pulse width modulation control signal.

18. The apparatus as in claim 1, wherein a magnitude of the intermediate voltage varies over time depending on resonance operation of the resonant power supply circuit.

19. The method as in claim 11, wherein an overall gain of the output voltage with respect to the input voltage is based on a combination of first gain provided by the resonant power supply circuit and second gain controlled by a pulse width modulation control signal.

20. The method as in claim 11, wherein the capacitor is a first capacitor;
wherein the resonant power supply circuit of the first stage includes a series circuit including an inductor connected in series with a second capacitor, the method further comprising:
selectively switching the first capacitor in series with the series circuit of the inductor and the second capacitor.

21. The power supply as in claim 1, wherein the capacitor includes a first node and a second node; and
wherein the phase delay circuit is operative to switch between applying the intermediate voltage to the first node and the second node of the capacitor.

22. A power supply comprising:
a first stage including a resonant power supply circuit operable to derive an intermediate voltage from an input voltage;
a phase delay circuit coupled between the first stage and a second stage of the power supply, the phase delay circuit operable to receive the intermediate voltage and delay conveyance of the intermediate voltage to the second stage, the intermediate voltage generated by the resonant power supply circuit;
the second stage operable to derive an output voltage to power a load from the delayed intermediate voltage outputted from the phase delay circuit;

wherein the phase delay circuit includes a switch circuit operative to switch between inputting the intermediate voltage to a first node and a second node of the second stage; and wherein the second stage is operable to derive the output voltage to power the load from the intermediate voltage received at the first node and the second node.

23. The power supply as in claim 1, wherein the phase delay circuit includes the capacitor to delay the intermediate voltage conveyed to the second stage, the capacitor including a first node and a second node; and wherein the phase delay circuit is operable to alternate between a first orientation and a second orientation of connecting the capacitor in series with the resonant power supply circuit of the first stage.

24. The power supply as in claim 23, wherein the first orientation includes applying the intermediate voltage to the first node of the capacitor; and wherein the second orientation includes driving the second node of the capacitor with the intermediate voltage generated by the resonant power supply circuit.

25. The power supply as in claim 1 further comprising:
a controller operable to control switches in the first stage via a first control signal; and
the controller further operable to derive a second control signal from the first control signal, the second control signal delayed with respect to the first control signal, the second control signal driving the multiple switches in the phase delay circuit to delay the conveyance of the intermediate voltage to the second stage.

26. The power supply as in claim 1, wherein the output voltage is a first output voltage; and wherein the second stage is further operative to derive a second output voltage from the delayed intermediate voltage outputted from the phase delay circuit.

27. The power supply as in claim 26, wherein the second output voltage is greater than the first output voltage.

28. The apparatus as in claim 1, wherein the phase delay circuit controls timing of switching the intermediate voltage to the second stage depending on timing of controlling switches in the first stage that produce the intermediate voltage.

29. The apparatus as in claim 28,
wherein the controller is operative to delay the timing of switching the intermediate voltage to different nodes of the second stage with respect to the timing of controlling the switches in the first stage that produce the intermediate voltage.

30. The apparatus as in claim 29, wherein the resonant power supply circuit includes a capacitor and inductor connected in series between the switches in the first stage and the phase delay circuit.

31. The apparatus as in claim 1, wherein a magnitude of the intermediate voltage varies over time.

32. The apparatus as in claim 31, wherein the output voltage is a DC voltage.

33. The power supply as in claim 1, wherein the phase delay circuit includes a first switch, a second switch, and a capacitor;

wherein the first stage includes an output node operative to output the intermediate voltage;

wherein the first switch is connected between the output node and a first node of the capacitor; and wherein the second switch is connected between the output node and a second node of the capacitor.

34. The power supply as in claim 33 further comprising:
a controller operative to switch between a first control mode and a second control mode;
wherein the first control mode includes activation of the first switch to an ON state and deactivation of the second switch to an OFF state; and
wherein the second control mode includes activation of the second switch to an ON state and deactivation of the first switch to an OFF state.

* * * * *